Patented Jan. 28, 1930

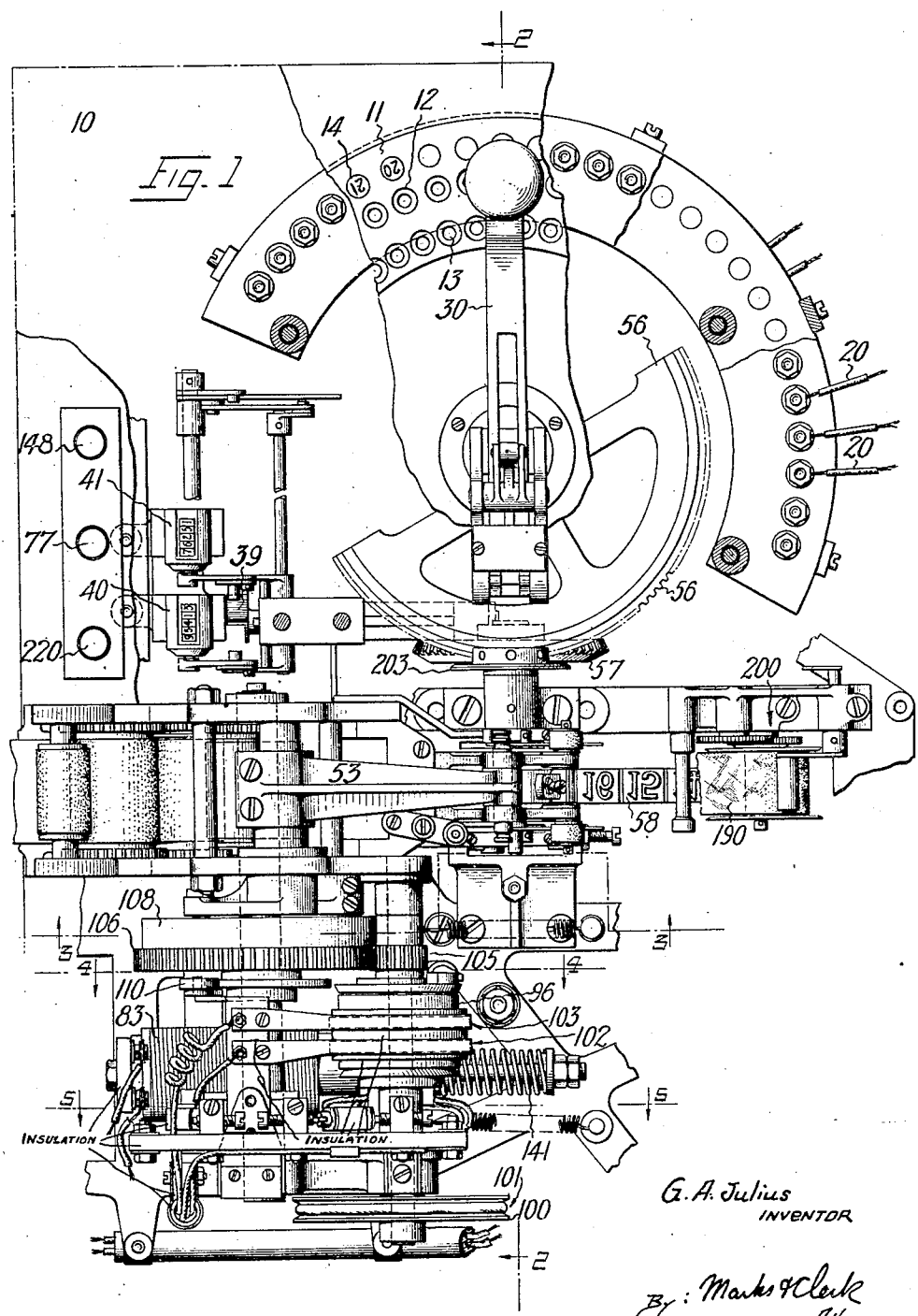

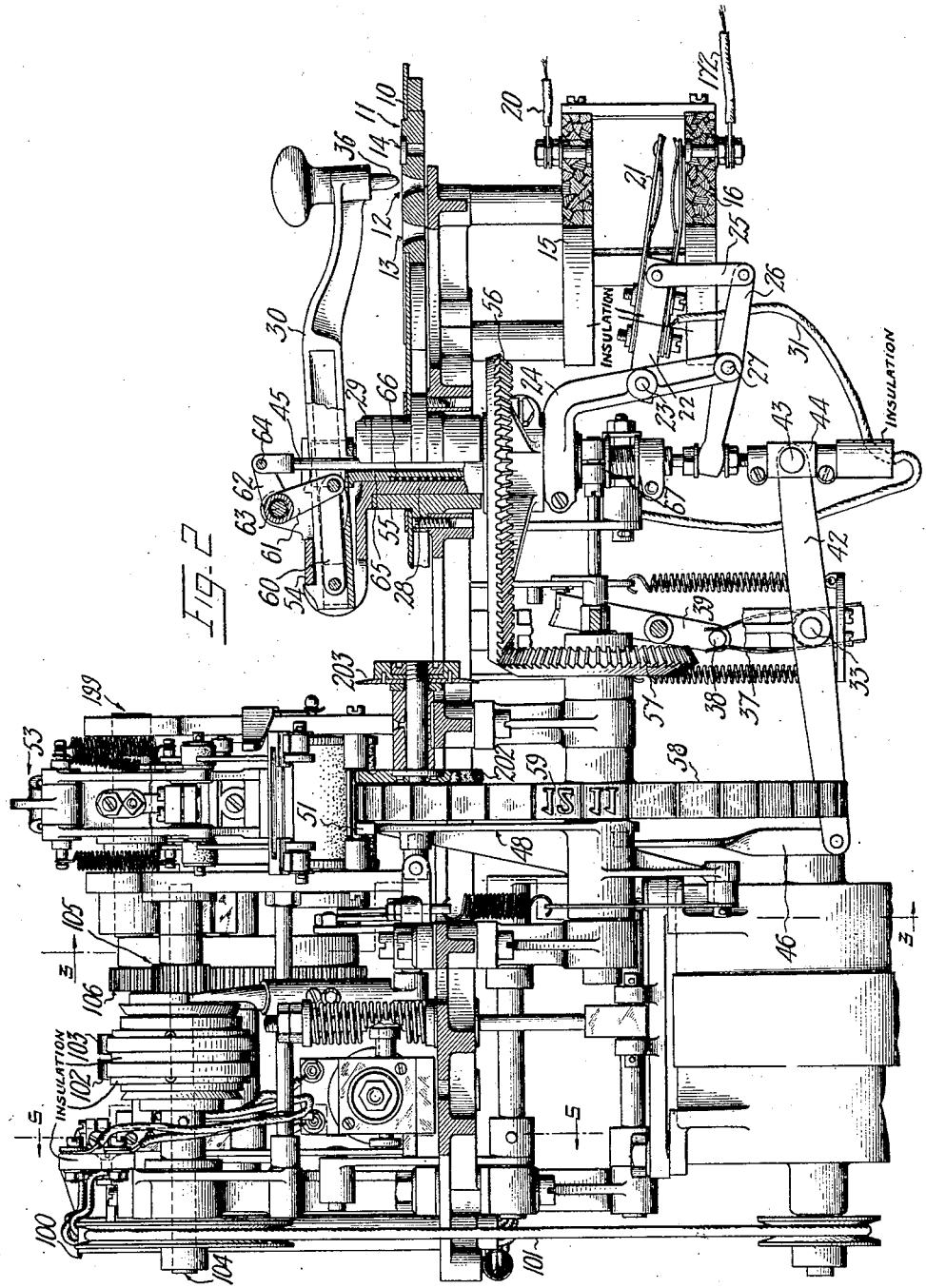

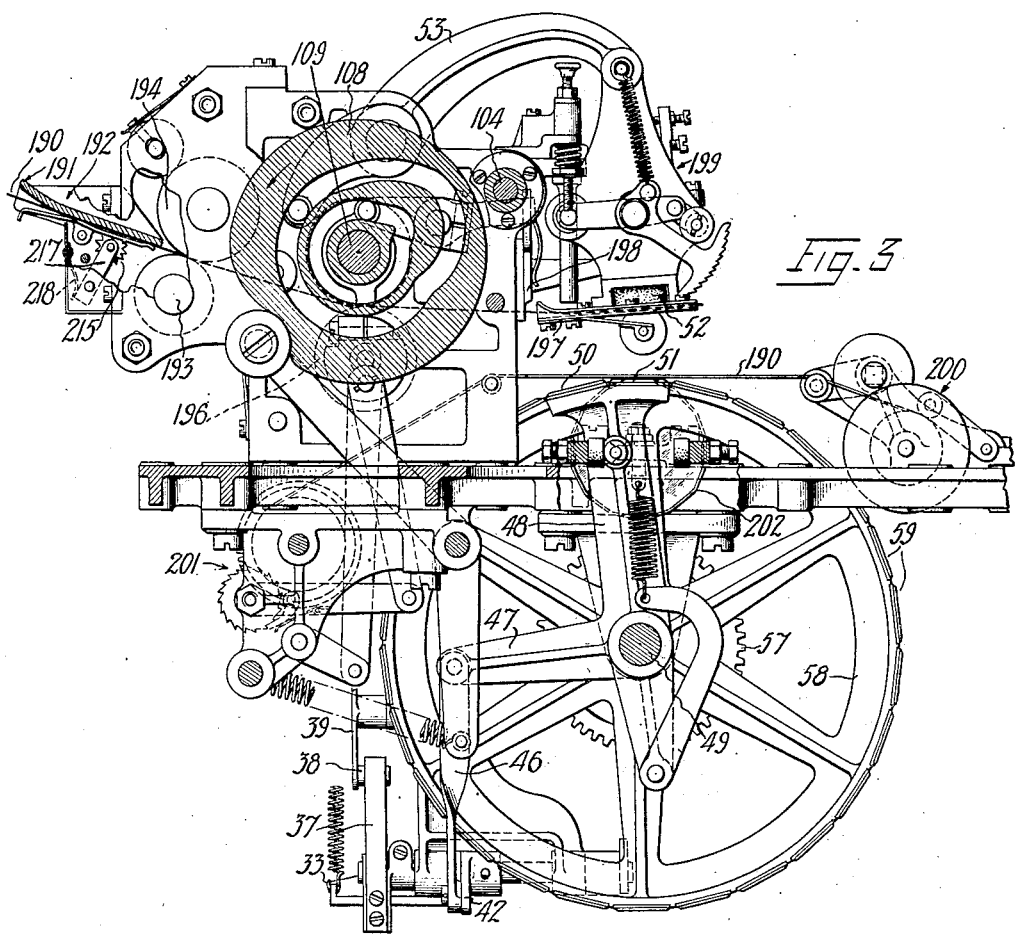
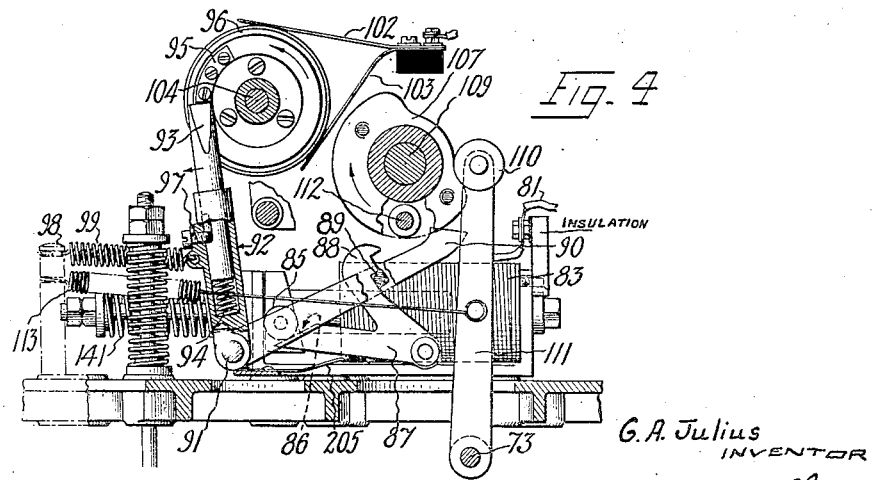

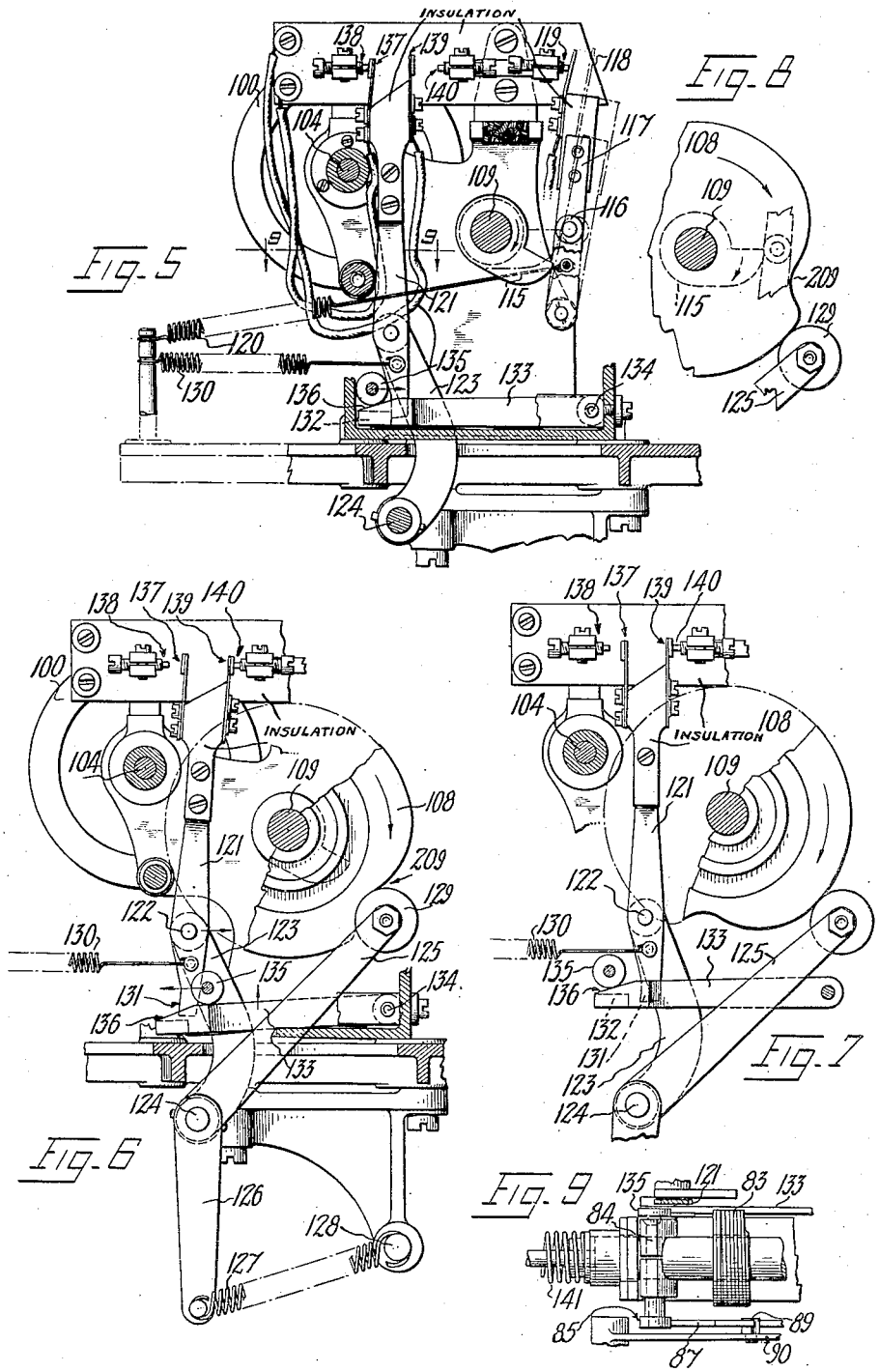

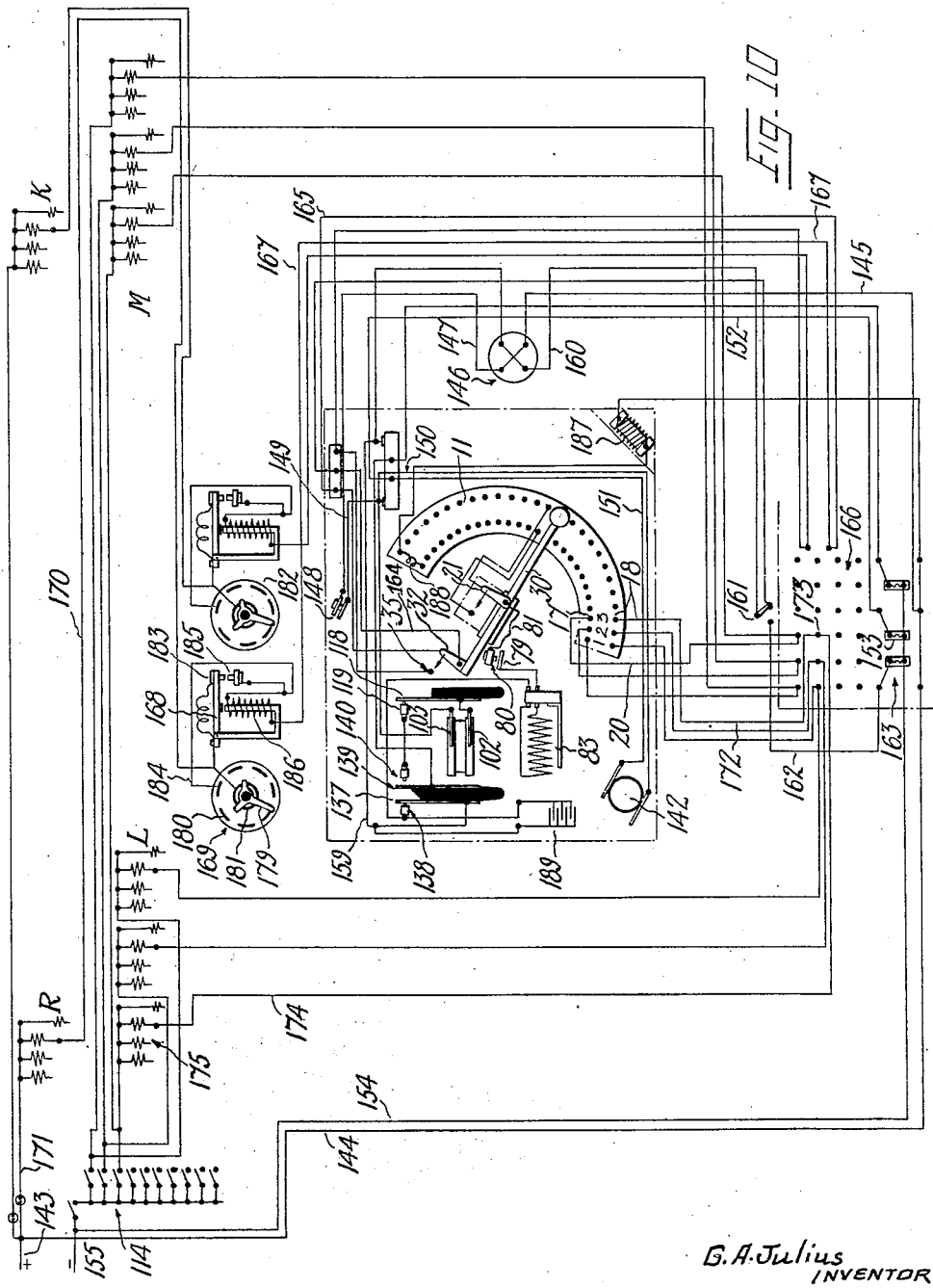

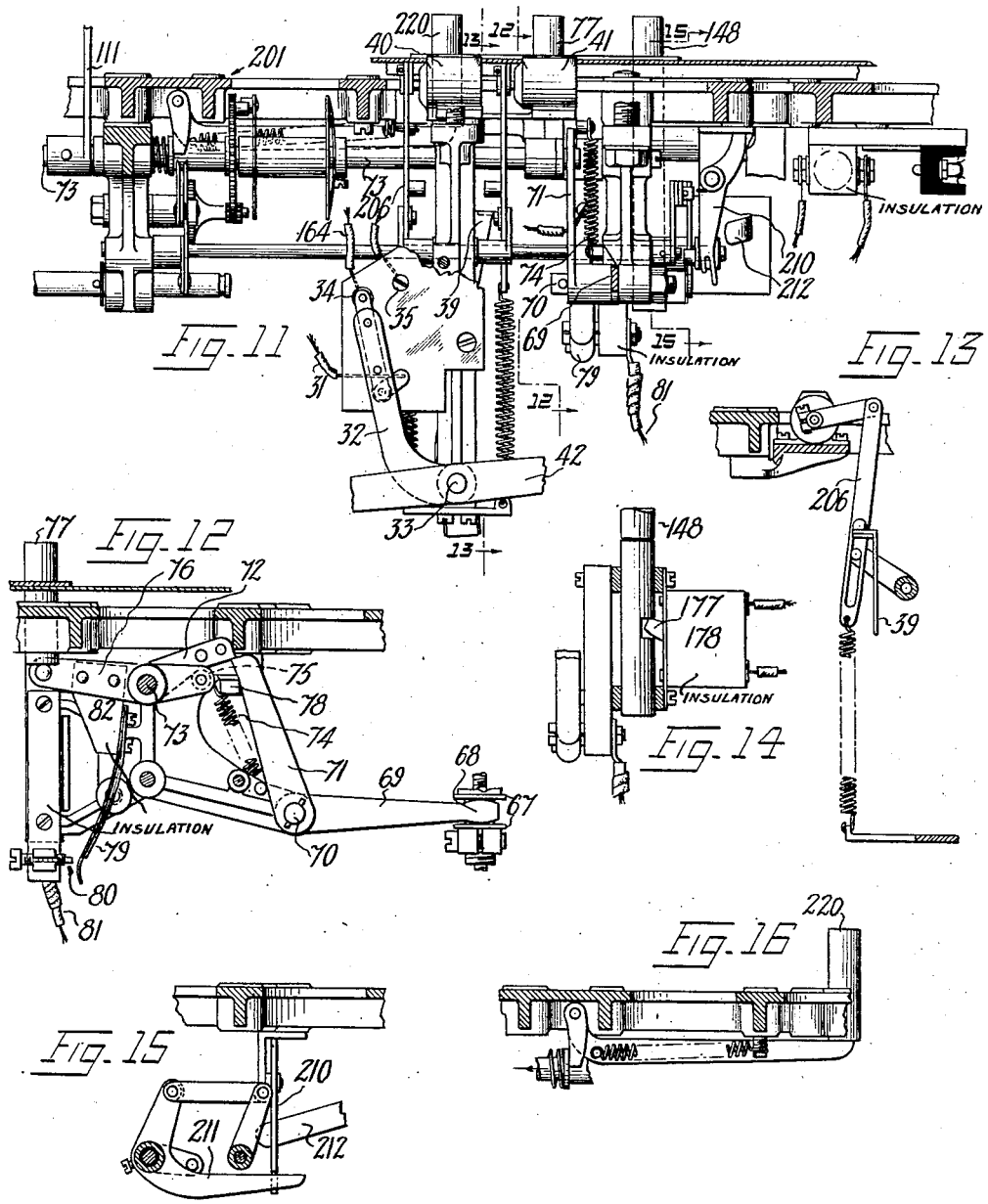

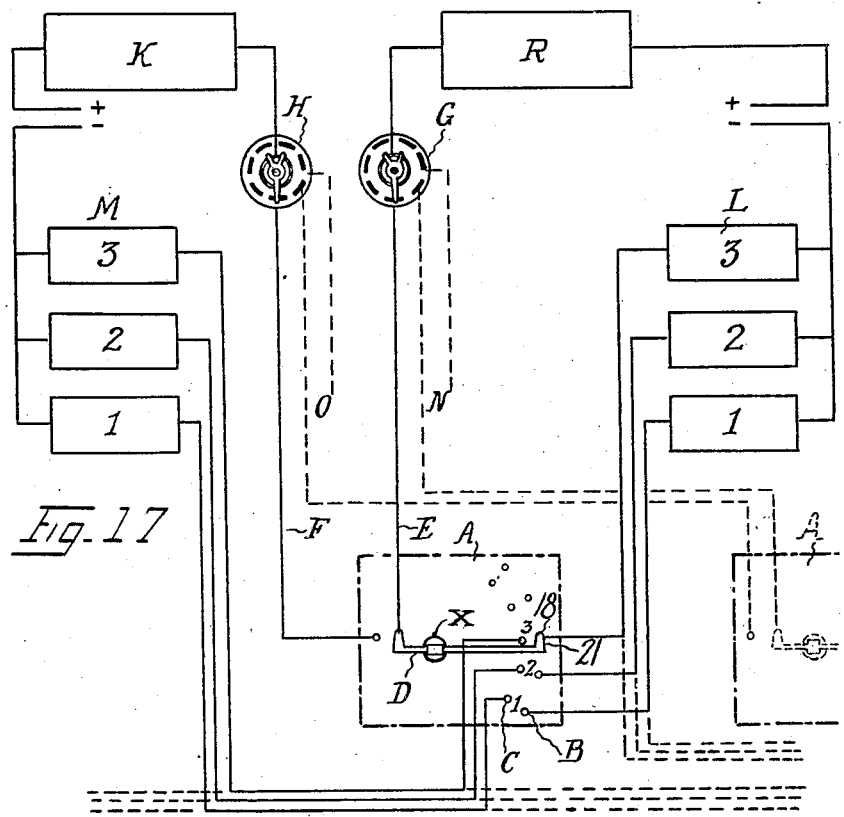

1,744,771

UNITED STATES PATENT OFFICE

GEORGE ALFRED JULIUS, OF SYDNEY, NEW SOUTH WALES, AUSTRALIA

MACHINE FOR PRINTING AND ISSUING TOTALIZATOR TICKETS AND FOR OPERATING TOTALIZATOR REGISTERS AND INDICATORS

Application filed June 7, 1927, Serial No. 197,135, and in Australia June 30, 1926.

This invention relates to machines for producing totalizator tickets and for effecting by electromechanical means registration and indication of the totals of issues of such tickets.

The primary object of the invention is the provision of ticket machines from which tickets may be produced in any one of a plurality of divisions in either of two different classifications according to the desire of the operator, and to automatically register and display on separate totalizers and indicators, the value of the tickets issued in each division of each classification, and the total value of all the tickets issued in each classification.

Hitherto ticket machines have been designed to issue tickets in a plurality of divisions in the same classification but it has been necessary to provide separate ticket machine equipment for each classification when tickets of two or more distinct classifications were to be issued.

Groups of machines according to the present invention may be operated in unison; all the data of each transaction which are registered in all the machines in the group are integrated automatically, and the grand totals of all transactions and the total for each transaction respectively, are displayed on public indicators.

The tickets are printed on a roll strip of paper, and cut off in the printing operation and ejected. Printing is applied on both sides of the tickets; it includes indicia identifying each transaction, the data relating thereto and other necessary check or identification matter. Provision is made for enabling the cancellation of waste ends of ticket strips and spoiled tickets, and for testing the functioning of the mechanism without affecting the registers or indicators and with security that when the machine is operated to produce negotiable tickets registration of the issues and display of the totals will be effected with certainty in the appropriate apparatus.

The machines are driven and operated independently, and the connections through the system from the machines to the integrators and indicators are entirely electrical, countershafts or other mechanical devices not being used. The machine is driven by a constantly running motor through a clutch. It is set and thrown into operation by the plunging of a selector lever, by means of which circuits are also completed to the registering and indicating apparatus. When the printing and issuing motions have been performed the operation of the machine is stopped automatically. Details of the machines will be described with reference to the accompanying drawings in so far as it is necessary to particularize them for the purpose of explaining the structure and operation of the features in which the invention consists.

A machine of this character is capable of many uses where a plurality of transactions each having common but different data characteristics are printed and issued as tickets as in ferry, railway, theatre or similar ticket printing machines.

Fig. 1 is a top plan showing the machine table, and the selector dial and the selector lever by which operation of the machine is controlled manually;

Fig. 2 is a side elevational view of the machine, certain parts being shown in section to facilitate explanation;

Fig. 3 is a transverse elevational section on the plane 3—3 Fig. 2;

Fig. 4 is a fragmentary transverse section showing a trip coil through which the machine is brought into action after the selector lever has been set and plunged, and through which operation of the machine is arrested after each ticket has been issued;

Fig. 5 is a fragmentary transverse section on the plane 5—5 Fig. 2;

Fig. 6 is a transverse section explanatory of the functioning of means for controlling a magnetic clutch through which the machine is driven by a motor, and also explanatory of the operation of switches associated with the trip coil;

Fig. 7 is a fragmentary sectional elevation similar to Fig. 6, showing the clutch control switch in the same position as in Fig. 6, but showing other parts of the mechanism in an advanced position;

Fig. 8 is a fragmentary sectional elevational view to be read following Figs. 5, 6 and 7 in order. It shows parts as they appear when a movement of the machine parts has been nearly completed,—Fig. 6 showing the parts at the commencement of rotation, Fig. 7 during rotation, and Fig. 8 nearing completion of rotation;

Fig. 9 is a fragmentary plan view showing the trip coil with portions of the mechanism on either side of it for operating certain switches which are shown in Figs. 5, 6, and 7;

Fig. 10 is a circuit diagram;

Fig. 11 is a longitudinal section on a zigzag plane through portion of the machine, showing an automatic switch which is moved by the selector lever to connect the machine in the circuit of the "win" indicator or in the circuit of the "place" indicator respectively;

Fig. 12 is a fragmentary transverse section on the plane 12—12 Fig. 11;

Fig. 13 is a fragmentary transverse section on the plane 13—13 Fig. 11;

Fig. 14 is a fragmentary elevational view explanatory of a stop switch by which operation of the machine may be arrested at any time;

Fig. 15 is a fragmentary section on the plane 15—15 Fig. 11;

Fig. 16 is an elevational view of some of the parts associated with the printing ribbon rewinding mechanism shown in Fig. 11 which are not clearly seen in that figure because of the interposition of certain other parts; and Fig. 17 is a schematic diagram explanatory of the relations and interconnection of the ticket machines, the "win" and "place" horse total indicators and grand total indicators, and the means whereby the circuiting of these elements is effected automatically.

In Fig. 17, A represents the ticket printing and issuing machine, B a bank of contacts therein through one or other of which the circuit is closed when the machine is set for registering a "place" bet, C another bank of contacts, one or other of which is closed when the machine is set for registering a "win" bet, D a selector lever through which a circuit is established to the appropriate contact in the bank B or in the bank C as the case may be, and by which also the circuit is closed through the line E for contacts in the bank B, and through the line F for contacts in the bank C. G and H are commutators through which the lines E and F including the source of current are carried respectively to the "place" indicator R or the "win" indicator K. The lines E and F continuing through these indicators are respectively carried through banks of "place" horse indicators L and "win" horse indicators M. N and O are lines corresponding with the lines E and F from other machines such as A. Circuits otherwise complete in any such connected machines are closed successively through the commutator G or the commutator H. If it be assumed that several machines such as A were operated simultaneously for the registration of a "place" bet on a particular horse, the circuits in each of these machines would be completed through the indicator R and through the indicators L successively by the commutator G. The circuits of these machines would be held until the registrations were transmitted to accumulators associated with the indicators R and L. The accumulators to which these registrations are delivered and by which they are unloaded onto the indicators are already known mechanisms which are extensively used in totalizator installations.

The selector lever D is slidable in and oscillatable on its rotatable support X. When it is moved by sliding it to the right, it is positioned for completing the circuit from any one of the contacts in the bank B to the line E as soon as it is plunged to bring its ends into touch with such contact in the bank B and also with a contact on the end of the line E; similarly, when it is moved by sliding it to the left and plunged, it is operative for connecting any one of the contacts in the bank C with the line F. A contact is provided in the bank B and in the bank C for each horse in the race, and the selector lever D is brought to register (by swinging it on its support X) with that contact which represents the particular horse on which a bet is required to be registered, and being thus brought into registering position the selector lever D is plunged to complete the operation, whereupon the machine A is caused to function to produce a ticket and deliver it out of the machine, the ticket being appropriately marked to indicate that it is a "place" ticket or a "win" ticket, and to indicate also the number of the race, the number of the horse, the date of the race, and any other appropriate particulars.

Each grand total indicator and each horse total indicator is controlled electro-magnetically. Each such indicator is provided with a mechanical accumulator which is controlled by an epicyclic train, the wheels of which are controlled by escapement rockers, each escapement rocker being operated by an electro-magnet. There is no novelty in that feature, as indicator apparatus of that type is well known. It is practicable to operate such indicators from a large number of issuing machines, each one of the issuing machines having its circuit extended through one of the electro-magnets by which the escapement rockers are operated. By introducing a commutator in the circuit of each such magnet, as many as seven, or even more, machines may be carried by each magnet, and the capacity of the system is thus increased.

Each impulse of current received from any of the machines connected to a grand total indicator in this way operates that indicator, adding one digit to the grand total; the current impulses then go to the bank of horse indicators (L or M as the case may be), but can pass only through that one of such indicators which is in the circuit. Thus, in the diagram, the selector lever D is shown closed on the circuit of No. 3 horse total indicator, and the circuits of the other horse total indicators are consequently open. In this case the No. 3 horse total indicator only will be operated and a digit added to the total displayed upon it. A complete wiring diagram for the system is not illustrated. Such a diagram would be extremely complex, and would not facilitate explanation of the features of the invention. It will be understood that all the machines A must be separately circuited to one or other of the electro-magnets which control the wheels in the epicyclic trains in a horse total indicator, on the principle shown in Fig. 17, and that the circuits out of said machines from the back contacts of the selector lever D must be carried to the grand total indicators through commutators G or H, for "place" and "win" registrations respectively.

Each machine A contains local counters on which is registered the number of tickets issued for the "place" class and for the "win" class of tickets respectively; either one or other of these local counters is operated once in each movement of the machines, the particular counter which is operated being determined by the setting of the selector lever D, either in the right hand position or the left hand position suggested in the figure. Certain elements which are necessarily included in the system are, for the sake of simplicity, omitted from the diagram Fig. 17; thus each commutator has a relay associated with it. These accessory features will be described in their proper order and relation.

The exposed portion of the machine is shown at the right of Fig. 2. The mechanism at the left of Fig. 2 is covered with a locked case, and the part of the machine below the table is also encased.

10 is the table of the machine, 11 a segmental selector dial having two ranges of dialling holes 12 and 13 formed in it, the holes 12 being allocated for a "place" operation of the machine, and the holes 13 for a "win" operation. It will be understood that a "place" bet is a bet that a particular horse will come either first, second, or third in the race, and that a proportionate dividend will be paid according to the place obtained by the horse; and that a "win" bet is a bet that the selected horse will win the race. 14 are number panels identifying the two rows of dial holes 12 and 13 lying radially within them. The numbers on the panels 14 correspond with the numbers given to the horses competing in the races. Below the table 10 two banks of contacts are carried, one above the other, on segments 15 and 16 of insulating material. The contact buttons 17 and 18 are positioned in correspondence with the positions of the dialling holes 12 and 13, that is to say they are directly below them. Each contact 18 is connected by a line 172 to an electro-magnet in the epicyclic train of a horse total indicator (L Fig. 17), and each contact 17 is connected by a line 20 with an electro-magnet in the epicyclic train of a "win" horse indicator (M Fig. 17). With these two banks of contacts 17 and 18 there co-acts a pair of spring switch blades 21 which are carried on an insulating block 22, which is pivotally supported at 23 on a bracket 24. These switch blades are movable to sweep over the bank of contact buttons 17 or the bank of contact buttons 18, and vertical movement to bring them to one or other position is applied to them through a link 25, by means of a rocking lever 26 which is fulcrumed at 27 on the foot of the bracket 24. The bracket 24 is fixed on the bottom end of the tubular stem 28 of a rotatable crosshead 29 in which the selector lever 30 is mounted. The tubular stem 28 is rotated when the selector lever 30 is traversed over the selector dial 11, and consequently the bracket 24 moving with it carries the blades 21 over the bank of contacts 17 or 18 according to whether it is in the upper or lower position; thus, when the selector lever 30 is over any particular dialling holes, (it is over the holes 17 in the position shown in Fig. 1) the spring blades 21 will occupy the "seventeen" position also in relation to the two banks of contacts; the spring blades 21 are connected by a flexible line 31 to a circuit-changing contact blade 32 (see Fig. 11). This arm is fixed on a rock shaft 33, and it is rocked to move the blade 32 to close the circuit from the line 31 through the contact button 34 or the contact button 35 respectively. When the selector lever is in the outer or "place" dialling position as seen in Fig. 2, the contact blades 21 engage the contact buttons in bank 18, and conversely when the selector lever 30 is slid backward so as to bring the dialling pin 36 over the "win" dialling holes 13, the contact springs 21 are swung upwardly so as to co-act with the contact buttons 17, and in this change movement from the lower to the upper position of the contact blades 21 the contact blade 32 (Fig. 11) has its position changed from the contact 34 to the contact 35.

The purpose of this switch changing movement will be apparent in reconsideration of Fig. 17. It is necessary to carry the circuit through the "win" grand total, and thence through the "win" bank of horse indicators, when the issue of a "win" ticket is registered on the machine; the switch 32 directs the circuit either to the "win" grand total or the "place" grand total indicator according to the positioning of the selector lever, and the switch 21 directs the circuit thence through the "win" bank of horse indicators or the "place" bank of horse indicators as the case may be, so that in the one case when the selector lever 30 is plunged the issue of the ticket is registered in the "win" grand total indicator, and on the indicator of that horse to which the ticket refers in the "win" bank of horse indicators, and in the other case through the corresponding circuit relating to registrations of "place" tickets.

The rocking movement of the shaft 33 performs also another function (see Fig. 2); the spring fingers 37 which it carries clasp an off-set pin 38 on a rocking arm 39 and operate to swing that rocking arm to right or left respectively. This rocking arm is provided to stop the operation of one or other of the local counters 40—41. As shown, 41 is the "win" local counter, and 40 the "place" local counter. These counters are counters of the "Veeder" type, and they are actuated in correspondence with the plunging movements of the selector lever; when that lever is in the "win" position, the "win" local counter is operated, and the "place" local counter is checked against movement by the arm 39 (Figs. 2 and 13); consequently in each machine a record is obtained and the number of tickets issued on "place" and the number of tickets issued on "win" bets.

Rocking of the shaft 33 is effected by a lever 42 which is driven by a pin 43 offset from the adjustable crosshead 44 on the stem rod 45 which is associated with the selector lever. The lever 42 is reciprocated when the rod 45 is reciprocated by the selector lever movement; the outer end of the lever 42 is connected by a link 46 with the arm 47 of a segmental member 48 which is mounted for free rotation on the shaft 49; this member 48 carries on the end of it two printing plates 50 and 51, 50 being inscribed "win" and 51 inscribed "place". When the member 48 is swung to the position shown in Fig. 3 the "place" printer 51 locates immediately below the platen 52. This platen is carried on an overhung arm 53 which will be described later. Conversely, when the selector arm 30 is pushed inward to dial for a "win" ticket the member 48 is moved to the right (Fig. 3) so as to bring the plate 50 below the platen 52. Consequently each adjustment of the selector lever 30 for "win" or "place" results in bringing a printing surface into operative relation with the platen 52 to print "win" or "place" respectively on the ticket strip 190 when the platen head is reciprocated as will be described hereinafter.

The selector lever 30 is slidably carried in a T head 54 of the rotatable cross head 29 which is integral with the top end of the tubular stem 28. This stem is supported in a bearing tube 55 fixed in the machine table, and it carries upon it a bevel segment 56 which is intermeshed with a bevel wheel 57 keyed on the shaft 49. When the selector lever 30 is swung to right or left to bring the dialling pin 36 to register with any particular dialling hole, the segment 56 is correspondingly rotated, and through the wheel 57 turns the shaft 49. A printing wheel 58 is keyed on this shaft; this wheel is armed on its periphery with printing plates 59 inscribed with numbers, and the parts are adjusted so that when the dialling pin 36 is in register with a dialling hole on any particular number, then that number on the wheel 58 will be brought to a position immediately below the platen 52. These numbers correspond with the numbers allotted to the horses in the race.

It has already been described that the blades 21 establish a circuit through one or other of the buttons in the contact banks 17 and 18, depending upon the adjustment of the selector lever 30; the movement of the blades 21 from one bank of contacts to the other is performed by mechanism obediently to the sliding movement of the selector lever 30 in the cross head 29. The back end of the selector lever is connected by a link 60 with one arm of a bell crank 61—62, the bell crank having its fulcrum pin 63 in the cross head 29. The bell crank arm 62 is pivoted at 64 to the top end of the stem rod 45; consequently in the insliding movement of the selector lever 30, the stem rod 45 is pushed down, and conversely in the outsliding movment of the lever the rod 45 is pushed upward; these movements are connected through the lower part of the stem rod through the lever 26 to the blades 21, and they are also applied through the lever 42 as before described, to control the local counters, and to bring the "place" and "win" printing plates 50—51 into operative relation with the platen 52. In the plunging movement of the selector lever the stem rod 45 remains idle. This plunging movement is applied directly to the bush 65. The lever 30 passes through the slotted head of this bush, and a spring 66 is fitted below to hold the bush normally in the upper position.

The collars 67 are fitted on the lower end of the bush 65, and they are consequently reciprocated when the selector lever is plunged with the dial pin 36 in one of the dialling holes 12 or 13. The collars 67 embrace the knuckle end 68 on the end of a crank arm 69 (Fig. 12). This arm is keyed on a rock spindle 70, and upon that rock spindle also a check arm 71 is keyed. This check arm coacts with another check arm 72 which is freely movable on the spindle 73, and is held downward by a helical spring 74. It bears on a roller tappet 75 on one end of a restoring lever 76. This restoring lever is controlled by a push button 77, which projects up through the table of the machine. When the selector lever 30 is plunged the shaft 70 is rocked thereby bringing the check arm 71 clear of the check arm 72, and the latter is thereupon pulled down by the spring 74; the end of the check arm 72 prevents the return of the check arm 71, and consequently the lever 69 is held down, and in turn it holds down the bush 65 and the selector lever 30. The selector lever is thus held in the dialled position after it has been plunged until the check 72 has been lifted. This lifting may be accomplished manually by pressing the button 77, but it is released automatically in the operation of the machine by the rocking movement of the spindle 73, whereby the tappet roller 75 is caused to act under it, to lift it and allow the check 71 to return to the position shown in Fig. 12, in contact with a fixed stop 78.

When the lever 69 is forced down in the way described by the plunging movement of the selector lever, the stop 71 is moved out; thereupon the spring 74 bears down the check piece 72, which, acting on the tappet 75, tips up the lever 76, and moves the contact blades 79 to meet the contact point 80 at which the line 81 terminates. The spring contact blades 79 are carried on an insulated block 82, fixed on the lever 76, and the line is carried to these blades. A circuit is thus completed through one or other of the contacts in the banks 17 or 18, through the contact 34 or 35 as the case may be, and also through the contacts 79—80. This circuit traverses the trip coil 83 and energizes it.

When the coil 83 (Figs. 4 and 9) is energized its armature 84 is pulled within it. This armature carries a tappet roller on each side of it. One of these tappet rollers 85 co-acts with the ramp face 86 on the tail of a rocking check piece 87; this check piece is notched as shown at 88 and a pin 89 on one side of a lever arm 90 is engageable in the notches. It is normally held in engagement with the pin 89 by a spring 205. The lever arm 90 is keyed to a spindle 91 upon which also is keyed a socket piece 92 which carries a stop plunger 93, which is seated on a cushioning spring 94 set in the socket 92. The stop 93 co-acts with a snug 95 on one side of the driven clutch member 96. When the stop 93 is swung over into the path of revolution of the snug 95 the snug strikes against it and the rotation of the driven member of the clutch 96 is arrested. The impact is taken care of by the spring 94, and parts are positioned by the adjustment of the stop 93 which is limited by the check screw 97. The socket 92 is bridled back to a post 98 by a spring 99, and when it is unrestrained the spring pulls it back so as to bring the stop 93 out of the path of revolution of the snug 95. Consequently when the trip coil 83 is energized and the check piece 87 is moved by the tappet 85 to release the pin 89 into the upper notch 88, the stop 93 is moved by the spring 99 to the open position and the clutch member 96 is then free to be rotated.

The driving member of the clutch is driven by a wheel 100 (Fig. 1) which is turned constantly by a belt 101, but the clutch is energized by current supplied to it from the brushes 102—103, which are wired in the circuit. As will be hereinafter described, the clutch is energized just after the energization of the trip coil has been effected, and immediately following the energization of the clutch the trip coil is de-energized. The stop 93 is, however, held open by the engagement of the pin 89 in the upper notch 88 of the check piece 87 until the tappet 112 depresses the arm 90. The driven member 96 of the clutch is keyed on a shaft 104 on which the wheel 100 and the driving member of the clutch are freely rotatable. A pinion 105 is also keyed to the shaft 104, and this pinion is geared into a spur wheel 106. This wheel carries a cam 107 on one side of it, and another cam 108 on the other side of it. The wheel 106 and its cams 107 and 108 are keyed on a shaft 109. The shaft 109 makes one complete turn in each complete operation of the machine. The cam 107 co-acts with a tappet roller 110 on the top end of a lever 111, which is keyed on spindle 73 (see Fig. 12), and the tappet roller 112 carried by this cam co-acts with the arm 90. The direction of movement of the shaft 109 and cam 107 is shown by the arrow (Fig. 4). As the machine movement is nearing completion the tappet roller 112 engages the end of the arm 90, forcing it down, and thus causes the pin 89 to re-engage under the lower notch 88 in the check piece 87, at the same time bringing the stop 93 into the path of revolution of the snug 95. The drive through the clutch is thus positively arrested near the completion of the machine's operation, and that operation is completed by the momentum which is sufficient to carry the stop snug around into contact with the top of the stop plunger 93. The roller 112 passes beyond the end of the arm 90 just before the machine is brought to a stop by the contact of the parts 95 and 93. At about the same time the tappet roller 110 falls into the hollow part of the cam 107; the spring 113 acting on the arm 111 moves it to the left thereby rocking the spindle 73. This spindle is rocked reversely by the cam action; this operation will be clearly understood from Fig. 4.

The spindle 73 will be seen also in Fig. 12. The rocking movement applied to it near the completion of the machine's rotation in the way just described, results in the lifting of the arm 72 from the check position up to the position shown in Fig. 12, thereby releasing the check arm 71 and permitting the selector lever 30 to rise and lift the dialling pin 36 out of the dialling hole in which it was registered.

If it should happen that the selector lever 30 be plunged in an idle dialling hole, that is to say in a dialling hole for which the corresponding contacts in the banks 17—18 have been cut out at the switch 114 owing to the horse to which they relate being scratched, the plunger will remain locked down by the check 72, and in that case it will be necessary for the operator to manually release it, for it cannot be released by operation of the machine, as the machine will not operate inasmuch as there is no circuit through the contact 21. This restoration is performed by plunging the button 77 thereby tipping the lever 76 and raising the check 72 so as to allow the check 71 to come back to the normal idle position shown in Fig. 12.

In Fig. 10 the switches by which the numbers allotted to scratched horses are cancelled, are shown at 114. The grand total "win" indicator coils are shown at K, the grand total "place" indicator coils at R, the bank of "win" horse indicator coils are shown at M, and the bank of "place" horse indicator coils are shown at L.

The mechanism for operating the movable platen head 53 and the ticket ejecting mechanism contains no substantially new feature; all this mechanism is operated by the double cam 108.

A cam 115 on the shaft 109 is engageable with a tappet roller 116 on an arm 117 which carries a spring blade 118. This blade coacts with an adjustable contact point 119. At the completion of an operation of the machine the cam 115 occupies the position shown in Fig. 5. It is there shown released by the tappet roller 116 to allow the arm 117 to be moved over by its spring 120, so as to bring the spring blade 118 into contact with the contact point 119. This contact remains closed whilst the machine is idle; it is opened a little prior to the completion of each operation of the machine, but closure happens immediately the cam passes the roller 116.

The double contact arm 121 is pivotally supported at 122, on an arm 123 which is fixed on a spindle 124, to which also other arms 125 and 126 are keyed. The arm 126 is bridled back by a spring 127 to a fixed member 128. The arm 125 carries a tappet roller 129 which engages the peripheral face of the cam 108. 130 is a spring in tension connected to the lower end of the double contact arm 121; the bottom end of that arm is formed as a check 131, which is engageable with a stop member 132 on an arm 133, which is pivotally mounted at 134. 135 is a roller on the far side of the armature 84; it co-acts with the arm 133, working on the ramp end of it 136. When the arm 133 is raised, the end 131 of the arm 121 is engaged behind the check 136, and contact is made between the spring blade 137 and the contact point 138, as shown in Fig. 5. When, however, the trip coil 83 is energized and its armature 84 is moved inward, the roller 135 running up the ramp 136 depresses the check arm 133, and releases the engaged end 131 of the arm 121. The arm being then free to swing on its pivotal support 122 is pulled over by the spring 130, thus opening the contact at 137—138, and closing the contact at 139—140 (see Fig. 6). This movement closes the clutch circuit. When rotation of the cam 108 commences the arm 125 is depressed, the arm 123 and the pivotal support 122 are moved to the right and the lower part of the arm 121 is also positively moved to the right, stretching the spring 130 (see Fig. 7). When the armature 84 is released by action of the spring 141 which acts in opposition to the pull of the trip coil 83, the roller 135 runs down the ramp 136, and the position of the check 132 in front of the heel 131 of the frame 121 is restored.

When the rotation of the cam 108 is completed, and the tappet roller again falls into the bay 209, the arm 123 is swung over to the left on its pivot 124. The check 131 on the arm 121 being then engaged behind the stop 132, the arm 121 is restored by the spring 130 to the position shown in Fig. 5.

Referring to Fig. 10—

142 is a motor. This motor may be associated with any number of machines located about the same place, and it drives the belts 101 of each of these machines. The motor circuit is shown complete as it would be required if only one issuing machine were in use. The positive side of the motor gets current from the main line 143 through lines 144, 145, cut-out switch 146, line 147, through the stop button 148, line 149, and line 150. The return circuit is via line 151, line 152, fuse 153, and line 154 to the negative terminal at 155. The motor is always in circuit as long as the contact controlled by the stop button 148 is closed.

Two circuits are made when the selector lever 30 is plunged. One of these circuits operates the machine starting and stopping mechanism and the other goes through the indicators. The starting and stopping circuit goes through the winding of the trip coil 83. At the starting position, the single pole switch 118 and the double pole switch 137—139 are in the position shown in Figs. 5 and 10, that is to say, the blade of the switch 118 is making contact with the terminal 119 and the blade 137 of the double pole switch is making contact with the contact point 138. The circuit goes from the top binding screw of the trip coil 83 through the contact 138 and switch blade 137, and thence by line 159 to the cut-out switch 146, thence by line 160 through the reversing switch 161, line 162, and fuse 163 to the negative line 154 and negative terminal 155. The circuit from the lower binding screw of the trip coil 83 goes to the blade 79 (see Fig. 12), and thence by line 81, and switch blade 32 to line 164 and line 165 to the distribution board 166, thence by line 167 to the relay 168, commutator 169, line 170 to the coils of the grand total indicator R, and thence by line 171 to positive line. The circuit branches at the selector lever 30, going via the contact springs 21 and thence through one or other of the contacts in the bank 17 or the bank 18. Thence the circuit may be conveniently followed in the diagram (Fig. 10) on the line 172 from the No. 3 contact in the lower bank 18, thence through the distribution board at 173, and line 174 to the No. 3 horse indicator coils at 175 and thence through the No. 3 scratching switch 114 to negative line at 155. It will be understood that if the selector lever 30 were in the "in" position (it is in the "out" position as shown in Fig. 10) the circuit would go through the "win" side indicators; as shown it goes through the "place" side indicators.

As already explained, the switches 118, 137, 139 are in the position shown in Figs. 5 and 10 when the selector lever 30 is manipulated to start. As soon as the lever is swung to bring the dialling pin 36 over to an appropriate dialling hole in the dialling plate 11, and is then plunged, the trip coil 83 is energized. Thereupon the double pole switch 137—139 is thrown to the right (Fig. 6) and is held in that position by its spring 130 until it is positively reversed in the manner previously described. The throwing of the double pole switch to the right completes the circuit through the magnetic clutch and drive is transmitted to the machine. Simultaneously the current traverses that one of the horse indicator coils which corresponds with the dial number on which the selector lever has been plunged, and also through the grand total indicator, and these two indicators are operated simultaneously with the machine operations in which the ticket is produced. When the machine operation is nearly completed, the cam 115 is fixed exactly for timing so that the machine will complete its operation by momentum and will be brought to rest by the arresting action of the clutch stop 93 when it intercepts the revolution of the snug 95 on the side of the driven member of the clutch. At the finish of the operation the tappet roller 129 falls into the hollow portion of the cam 108. Meantime the trip coil 83 having been deenergized, its armature is retired by the pull of the spring 141, and the rollers 85 and 135 are brought to the left, so freeing the check members 133 and 87. Movement of the arm 123 swings the carrier arm 121 to the left and thus restores the double blade switch 137—138 to the left-hand position shown in Figs. 5 and 10, which is the idle position. The machine is thus reestablished in idle position ready for another operation.

Fig. 14 shows some detail of the stop button 148 (see Fig. 10). This button presses on a plunger 176 which engages a notch in a snap lever arm 177 of a switch 178. No means are provided above the table for restoring the plunger 176, consequently if the operator should depress the button 148 he thereby opens the circuits and renders the machine inoperative. To restore the machine for operation again it must be approached from below by an authorized person.

In the description of the circuit arrangement the commutator 169 and its relay 168 were referred to. The purpose of the relay is to hold the circuit for a sufficient time to ensure effective operation of the indicator mechanism. The contact member 179 of the commutator works over a series of interrupted contact plates 180 and over a ring 181. The ring is connected to the line 170 (or in the case of the commutator 182 to the corresponding line). The line 170 is also carried through the frame of the relay to its contact button 183. The line 184 from that one of the contact plates 180 which corresponds with the particular machine is branched to the contact 185 and to the coil 186 of the relay and thence goes to the line 167. When the contact is closed by the arm 179, that circuit is held closed by the relay until the machine has finished its operation. The commutator is driven at a speed which ensures the lapse of sufficient time between the successive makings of the circuit through the commutator to allow of the operation of the indicator coils in the circuit through which the impulse is registered in those indicators. The circuit is thus held after each plunge of the selector lever until the registrations have been established at the grand total indicators and the horse total indicators. Meantime the commutator, which is wired up also to a number of similar machines, is delivering the impulses from each of those machines to the appropriate indicator selected by the particular machine and the impulses from the several machines are thus delivered seriatim and without risk of overlapping.

189 is a condenser parallel with the switches for the purpose of reducing sparking troubles.

187 is the resistance coil in the test circuit. The test circuit is indicated at 188; it is established at one end of the selector dial 11. To use this test the switch 161 is reversed. The machine is thus rendered inoperative for the production of a normal ticket. The "test" mark is applied to the ticket by a printing surface marked "Test" on the wheel 58, and it has no horse number printed on it. It indicates whether the machine is functioning correctly without making a record of the issues of a ticket and without producing a negotiable ticket.

Figs. 13 and 15 show the mechanism by which the operation of the Veeder counters 40—41 is interrupted. The reciprocation of the link 220 by means of which the counters are operated is checked by the interposition of the arm 210 in the path of the reciprocating lever 211. The arm 210 is moved into the checking position by a member 212 on the plunger assembly, when the plunger is moved over the "test" ticket dialling hole. This mechanism forms no part of the present invention and need not be particularly described.

The operation of producing a ticket is identical with the operation performed on a similar machine of this type already known. 190 is the ticket strip which is drawn from a reel and enters the machine through the throating 191, passing the canceller 192 as it enters. The canceller does not mark the ticket strip 190 as it is passing into the machine, but if the strip should be drawn back, the canceller will mutilate it. The canceller is a device comprising a plurality of star wheels 215, each carried on a pivoted swing arm 217, and a stop disposed to limit the backward swing of the arms 217. A light spring 218 bears against the lower ends of the arms 217, and tends to swing them against the stop and to bring the teeth of the star wheels into engagement with the ticket strip. The star wheels trail freely over the ticket strip as it passes into the machine but mutilate it when the strip is drawn backward. This mechanism is required in the equipment to prevent fraudulent claims on partially printed tickets drawn from the machine through the throat 191, when the end of a strip roll is reached, or when the rolls are changed after a race, or when from any other cause the strip is withdrawn through the throat 191.

The underside of the ticket is first printed by the printing roller 193,194 being a platen roller. In the next operation of the machine the partially printed ticket strip is drawn between a printing roller 195 and a platen roller 196 below the ticket course, and in the next movement the strip passes into the gullet 197 under the platen 52 and over the type wheel 58. plate 50 or 51, and type wheel 202. In this final printing, it receives the horse number, and the race number and is marked "win" or "place" according to the position of the selector arm. 202 is a printing wheel adjustable by means of a hand piece 203. This wheel is rotatable manually with great facility for the purpose of changing the number of the race on the tickets. 198 is a guillotine by which the ticket length is severed from the strip and 199 is the ejector mechanism. There is no substantial novelty in the guillotine, the ejector or the printing rollers, though general refinement of design is disclosed.

The printing ribbon traversing mechanism consisting of the parts 200 and 201 although exhibiting a number of improvements in mechanical detail, is a minor portion only of the invention. 54 is the ribbon which is shown traversing above the wheel 58 and the sector 48. 220 is a push button by means of which the ribbon traversing mechanism is released for rewinding (see Fig. 16).

What I claim as my invention and desire to secure by Letters Patent is:—

1. A totalizer ticket printing machine of the type described, including a selector dial having inner and outer concentric rows of dialling holes, two banks of contacts associated therewith and electrically connected to two separate groups of electro-mechanical totalizers relating respectively to tickets in two distinct classifications, a selector lever with a dialling member, said lever being rotatable on a vertical spindle and also movable in a radial direction relatively to said spindle to locate said dialling member in any dialling hole in either of said rows, means controlled by the circular and radial movements of said lever for setting printing mechanisms to print tickets in any of a plurality of divisions in either of said classifications and switches associated with said selector lever adapted for selecting and closing circuits through the machine and through either of said groups of totalizers to procure the operation of the machine and of said totalizers in correspondence with the setting of the selector lever to register the number of tickets issued for each division of each classification and the grand total of all the tickets issued in each classification.

2. In a totalizer ticket printing machine according to claim 1, a cross head with a tubular stem supported above the table of the machine, a selector lever slidable horizontally and oscillatable vertically in said cross head, a rod slidable in said tubular stem, linkage adapted to apply vertical movement to said rod when the selector lever is slid in the cross head, a change over switch blade connected to said rod and adapted to coact with any contact in either bank of contacts, a rocking lever connected to said rod, and means operated by said lever for marking the tickets to indicate their classification.

3. In a totalizer ticket printing machine of the type described a rotatable cross head with tubular stem supported above the table of the machine, in a plurality of divisions, a rod slidable in said tubular stem, a selector linkage adapted to apply vertical movement to said rod when the selector lever is slid in the cross head, means for limiting the sliding movement of the lever, two banks of contacts electrically connected to two separate groups of totalizers, a change over switch blade mechanically connected to the rotatable cross head and movable therewith, and linkage connected to said rod and said switch blade for changing the switch blade over from one bank of contacts to the other bank when the selector lever is slid in the cross head.

4. In a totalizer ticket printing machine of the type described, a dial with two rows of dialling holes relating respectively to tickets in a plurality of divisions of two distinct classifications each concentric pair of holes being allocated to a corresponding division in each of said classifications, a selector lever with a dialling member plungable in any hole in either row of holes, a printing wheel with one type face corresponding with each concentric pair of dialling holes respectively, means actuated by the rotary movement of the selector lever for moving a selected type face into printing position, and two auxiliary printing plates adapted to print the classification marking on the tickets, one or other of said plates being moved into position in the radial sliding movement of said lever.

5. In a totalizer ticket printing machine of the type described, a rotatable cross head with a tubular stem supported above the table of the machine, a selector lever slidable and oscillatable in said cross head, a rod slidable in said tubular stem, linkage adapted to apply vertical movement to said rod, a rocking lever pivotally connected at one end to said rod, and an oscillatable arm with two printing faces, one or other of which is moved into printing position by said rocking lever when the selector lever is slid in the cross head.

6. In a totalizer ticket printing machine of the type described, two banks of contacts connected respectively to separate groups of totalizers relating respectively to tickets of two distinct classifications, in a plurality of divisions, a selector dial with two concentric rows of dialling holes, one concentric pair of holes relating respectively to said banks of contacts the inner hole of each concentric pair of holes being allocated to a division in one classification and the other hole being allocated to the corresponding division in the other classification, a rotatable cross head supported above the table of the machine, a selector lever slidable and oscillatable in said cross head, and a switch blade positioned in the rotary movement of the selector lever in relation to the pair of contacts allocated to the selected division and positioned in the sliding movement of said lever in relation to one or other of the banks of contacts to register the selected classification.

7. In a totalizer ticket printing machine according to claim 1, including means for feeding a continuous ticket strip, and for severing the tickets from the strip for issue— a slotted throating through which the strip passes into the machine, and a plurality of swinging arms with a star wheel on each arm, the teeth of said star wheels entering the slots in the throating, with clearance to allow the strip to pass freely through the throating in one direction only and to mutilate the strip when it is moved in a reverse direction.

8. In a totalizer ticket printing machine of the type described, a segmental dial having in it two concentric rows of dialling holes, a manually movable selector lever with dialling pin adapted to be located over any hole in either row, said lever adjustable radially and traversible over said dial, two concentrically disposed banks of contact points corresponding with said dialling holes and connected to units in total registers and indicators, a switch controlling a circuit which governs the operation of the ticket printing elements and means for closing said switch dependent on the plunging of the selector lever, a switch blade mechanically coupled to the selector lever and adapted to close on that one of said contact points which corresponds with the dialling position of the selector lever, and another switch blade movable obediently to the selector lever movement to complete a circuit through one or other of two contacts, one of which is related to one of the said banks of contact points and the other to the other of said banks of contact points.

In testimony whereof I affix my signature.

GEORGE ALFRED JULIUS.